Aug. 9, 1960    J. R. OISHEI ET AL    2,948,010
WINDSHIELD CLEANER
Filed April 19, 1956    2 Sheets-Sheet 1

INVENTOR.
John R. Oishei and
BY Raymond A. Deibel
Bean Brooks Buckley + Bean
ATTORNEYS Aug. 9, 1960        J. R. OISHEI ET AL        2,948,010
                    WINDSHIELD CLEANER
Filed April 19, 1956                          2 Sheets-Sheet 2

INVENTOR.
John R. Oishei and
BY Raymond A. Deibel
Bean Brooks Buckley + Bean
ATTORNEYS United States Patent Office 2,948,010
Patented Aug. 9, 1960

2,948,010

WINDSHIELD CLEANER

John R. Oishei, Buffalo, and Raymond Deibel, Cheektowaga, N.Y., assignors to Trico Products Corporation, Buffalo, N.Y.

Filed Apr. 19, 1956, Ser. No. 579,361

1 Claim. (Cl. 15—250.27)

This invention relates to the cleaning of windshields and more particularly to the wiping of a panoramic type shield wherein its frontal area of slight curvature is continued around relatively sharper bends or crest areas and into lateral areas at the opposite sides of the vehicle for giving the broadest continuous panorama uninterrupted by corner posts or other vision-blocking body structure. The present invention is an improvement on the disclosure made in earlier Patent No. 2,691,186 wherein a section inwardly of each crest area of the windshield is wiped by a pair of cooperating wipers to afford thereat a doubly wiped primary field of vision in the direct cleared vision area in front of the car operator. In such earlier disclosure a central frontal portion of the windshield is left unwiped and consequently the normally broad field of vision centrally of the vehicle is interrupted during inclement weather by a cloudy unwiped area.

The need of cleaning the windshield for its full width is vital in contemplation of a motor car body structure wherein the vehicle steering mechanism may be placed on the centerline of the car so as to position the driver more advantageously to carry on the vehicle operation from the centrally positioned vision point from which he has substantially equal angles of vision through both sides of the windshield. In respect to wet weather driving, the repositioned steering mechanism precludes any possibility of acceptably wiping the windshield with the customary and commonly used double wipers functioning in their usual opposed motion relation, leaving the uncleared area amidship and directly blinding off the centrally positioned driver's vision ahead.

In the multi-bladed structure designed for the offside driving position, the more frequent lifting of the moisture from the shield by double wiping is unobtainable for the most effective utility where the steering mechanism is moved centrally. In order to provide the same high-frequency moisture-lifting in the central area, the instant invention includes the use of centrally positioned wiping means flanked on the right and left by a crest clearing wiper that moves from the frontal area around the crest area and onto the lateral side area to provide substantially the same degree of overall cleared area of the windshield while at the same time bringing into the central shield field this desirable double wiping advantage.

The primary object of the present invention is to provide a windshield cleaner in which the entire transverse expanse of the panoramic windshield is cleaned by a series of oscillating wipers to maintain the complete panorama across the front of the vehicle entirely devoid of panorama-disrupting uncleaned areas and to maintain vision by doubling up on the moisture lifting frequency across the primary vision area of the windshield. This cuts in half the time lag between clearing wiper strokes.

A further object of this invention is to provide a multi-bladed cleaner for this type of windshield in which the wipers are parked against the windshield frame outside the cleaned field so as to leave the entire transparent area available for driving during fair weather.

A still further object of the invention is to provide a windshield cleaner with a multiple number of wiping elements oscillating in a novel manner to remove all deposit from the cleaned field of vision during each cycle and discarding it to the margin of the field thereby to maintain a clear and unobstructed area across the frontal area.

This novel result is accomplished by rotating the arm travel to move all the blades to a greater degree in their arcuate paths while traveling toward one side of the glass. For example, in the four-bladed assembly of Fig. 4, three of the blades when moving clockwise across the field of vision will carry off any moisture pickup left at the counter-clockwise terminals of the preceding strokes, sweeping the field of vision downwardly and discharging the moisture toward the bottom molding or cowl of the windshield. In so doing the overridden areas of three of the blades are doubly wiped, such area being wiped four times during each oscillatory wiping cycle.

Another object of the invention is to overcome the handicap of the heretofore commonly used two-bladed wipers which swept outwardly over the curved sides simultaneously with the assistance of wind and gravity but upon the return strokes were confronted with these oppositional forces, thereby subjecting the driving motor with unusual torque conditions. In the instant invention the wipers move in phase with the result that the wind pressure is balanced in a manner to exert a uniform torque load on the motor and thereby protect the mechanism from abnormal and irregular strain.

A further protective measure for the power unit of the windshield cleaner mechanism is accomplished by securing a high frequency wiping action from a low speed power unit. With the trend in modern vehicles of utilizing a greatly extended windshield glass area, the problem of obtaining ample power for the windshield cleaning system has developed the need of larger wiper motors. The arrangement of the wiper blades in the present invention, where a plurality of blades pass across the terminal areas and substantially overlap one another, provides a resultant wiping pattern on the frontal section of the shield which is doubly wiped through cooperating wipers that may be individually actuated at reduced motor speed having heavier torque than obtainable with smaller motors. The sources of power, such as compressed air or electricity, for driving larger windshield motors are somewhat limited incidental to the restrictions embodied by the nature of the mobile power plant. However, with the broad double wiping action, the capacity of the power unit with less blade travel speed does not have to be taxed abnormally and yet will maintain satisfactory vision through the larger vision areas in the frontal portion of the windshield.

Again, the invention has for its object to provide a windshield cleaner for windshields having deeply curved crest areas at the sides, in which oscillatory wiper means for the central area are flanked by normalizing wipers that oscillate over the crest and side areas and concurrently adjust themselves to hold the flanking wipers normal to the respective area contours.

In accordance with the present invention, a plurality of oscillatory wipers are arranged to cooperate with one another to give high frequency wiping cycles on the medial portion of the windshield and less frequent wiping for an enveloping secondary field substantially coextensive with the panoramic contour. The employed wiper mechanism embodies a primary medial section and flanking side sections. The flanking sections are automatically adjusted to maintain their wipers in a normal attitude independently of the central wiper means. The features of the plural-wiper arrangement are carried further through the modification of the medial section to include a central wiper or a centrally positioned pair of wipers moving in parallel with each other, and in parallel with the outwardly positioned arms and blades arranged for wiping the side sections. Thus, the medial section may be increased in transverse extent by the addition of other oscillatory wipers. In one embodiment four blades move in parallel relation with each other. The two centrally positioned blades function to double-wipe the important central area of the windshield that is wiped over by each of the centrally mounted blades in the line of sight directly ahead, and likewise these same two centrally mounted wipers extend a secondary field thereabout both to the right and left to clean the entire frontal section of the windshield.

An important advantage derived from the use of the present invention is that it permits the use of the oscillatory type of wiper which through many years of use by the industry has proved satisfactory for effecting a rapid wiping of the shield for traveling at fast speed. The several wipers combine to produce the cleaned pattern and to park the wiper to one side thereof. This advantage and the foregoing objects will manifest themselves as this description progresses, reference being made to the accompanying drawing, wherein Fig. 1 is a schematic fragmentary view of the motor vehicle embodying the present invention;

Figure 1:
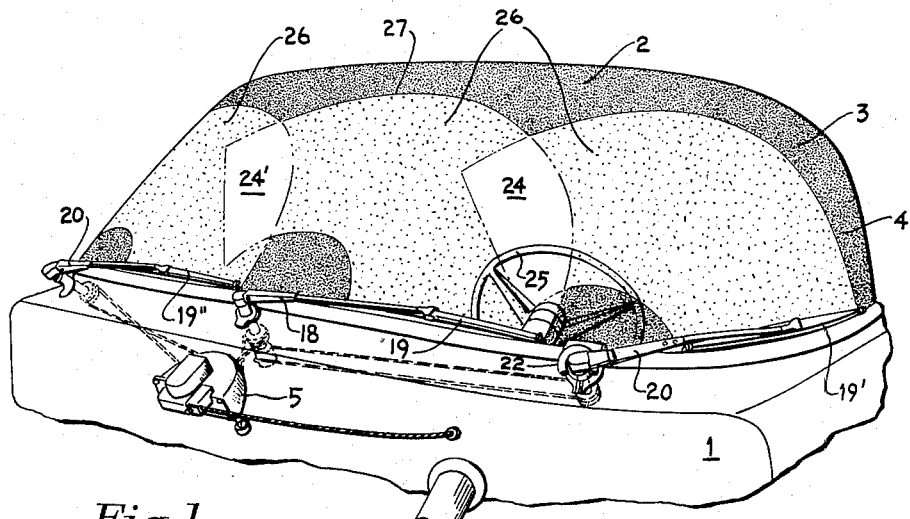
Figure 2:
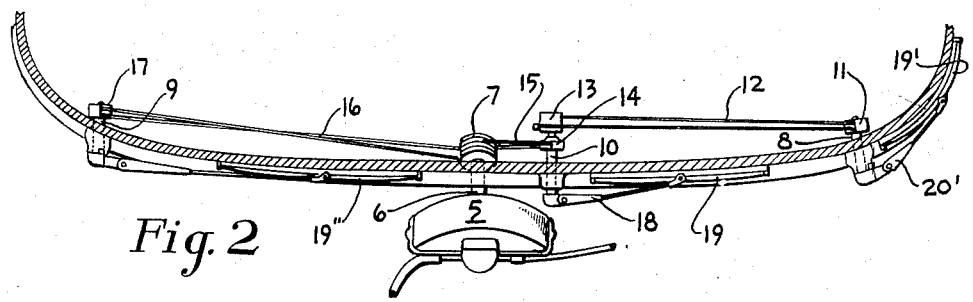
Fig. 2 is a horizontal section through the windshield showing the windshield cleaner installation.
Figure 5:
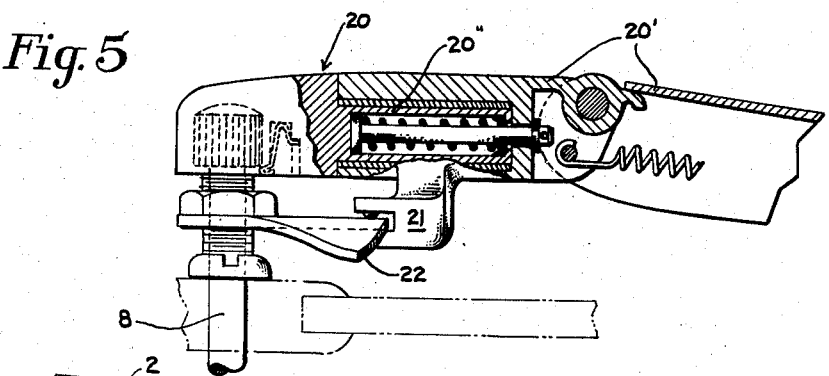
Fig. 5 is a detail view showing the normalizing mechanism for the flanking crest wiping blades.
Figure 6:
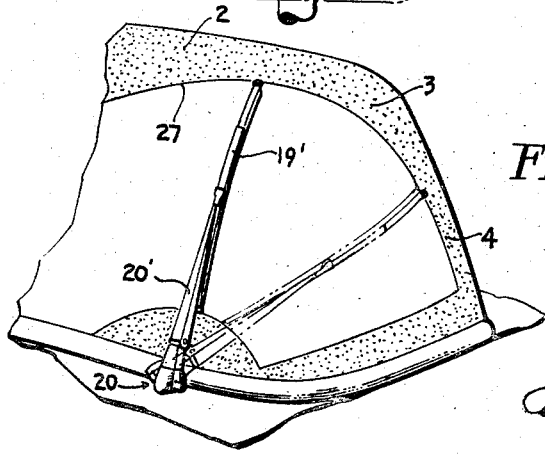
Fig. 6 is a schematic view showing the wiping action of a side wiper.

Referring more particularly to the drawing, the numeral 1 designates a motor vehicle having a windshield with a frontal area 2, crest areas 3 and side areas 4. The windshield cleaning system illustrated in Figs. 1 and 2 comprises a power unit 5 in the form of a fluid motor 5 having an oscillatory shaft 6 carrying a drive pulley 7 which, in turn, is connected by a cable transmission to plural wiper shafts 8, 9 and 10 journaled at the lower side of the wind shield below the transparency thereof. Each wiper shaft is equipped with a pulley, pulley 11 being fixed on the driver's wiper shaft 8 and connected by cable 12 to pulley or drum 13 fixed on the medial wiper shaft 10. Shaft 10 may have second pulley 14 fixed thereon and connected by a cable 15 to the drive pulley 7, and a third cable 16 connects the drive pulley to the passenger's pulley 17. The medial wiper shaft 10 has a spring arm 18 carrying a wiper 19 back and forth over the comparatively flat surface of the frontal area 2 while the flanking wiper shafts 8 and 9 carry wiper arms 20 for oscillating their respective wipers 19' and 19" over the opposite crest portions of the windshield, such portion including a crest area and adjacent portions of the front and side areas 3 and 4. The crest wiper arms are constructed to automatically rotate their wipers to maintain them in a normal attitude on the changing surface contours of the crest areas as they move thereabout. For this purpose, the outer blade carrying section 20', Fig. 5, is provided with a follower 21 to cooperate with a fixed normalizing cam 22 to cause the outer section to oscillate about the stub shaft mounting 20" and rock the wiper on its wiping edge for holding the normal attitude as it moves over the crest portions. This normalizing construction is set forth more particularly in copending application Serial No. 464,967, now Patent No. 2,781,540.

The cable transmission is so arranged as to oscillate the several wipers in parallelism and to park them in the same direction down against the windshield molding or frame. The placement of the wiper shaft is such that the paths of the several wipers overlap substantial portions of each other to define doubly wiped primary fields of vision in the frontal area of the windshield. Thus, the path of the medial wiper 19 overlaps that of the driver's wiper 19' to provide a primary field of vision, designated by the numeral 24, within the line of forward sight of the driver behind the steering wheel 25. The medial wiper path also overlaps the path of the wiper 19" of the passenger to define a second doubly wiped primarily field 24' through which the passenger may view traffic ahead. These two primary fields of vision are located within the frontal area and are supplemented by a singly wiped secondary field 26 to make a composite expanse which is substantially coextensive in width with the windshield and extends above and below the line of forward sight throughout. This composite field is delineated by an upper scalloped margin 27 while the end adn lower margins are marked out by the opposite ends of the wiping strokes.

Preferably the medial pulley 14 may be slightly smaller than the drive pulley 7 to vary its wiper speed relative to that of the crest wipers 19', 19", which latter are driven in phase at the same angular velocity. The angular displacement of the wiper shaft 8 is accommodated by the drum 13 which receives the cable 12 in a manner to avoid chafing the cable as it winds onto and off the wheel.

This arrangement provides a windshield cleaning system having a medial or central wiping means flanked on opposite sides by two crest wiping means, the medial wiping means having an oscillatory motion confined solely to the frontal area and the crest wiping means having a combined oscillatory and gyratory motion to wipe around the crest areas. Each crest wiping means incorporates a normalizing mechanism to hold the wiping blade in a normal attitude. These dual motions, namely, the medial oscillatory blade travel and the flanking gyratory oscillations are driven from the sole power unit 5 for satisfactorily accomplishing the task of cleaning the deeply though irregularly curved surfaces of the panoramic windshield to give the driver as well as the passenger a full panorama and at the same time to afford each a doubly cleaned primary field for fast speed driving in severe inclement weather. The medial wiping action of the cleaning system, by cooperating with the crest wiping actions, affords a primary field spread across the frontal area to enable forward straight ahead vision not only to the driver but also to his passenger.

Figure 3:
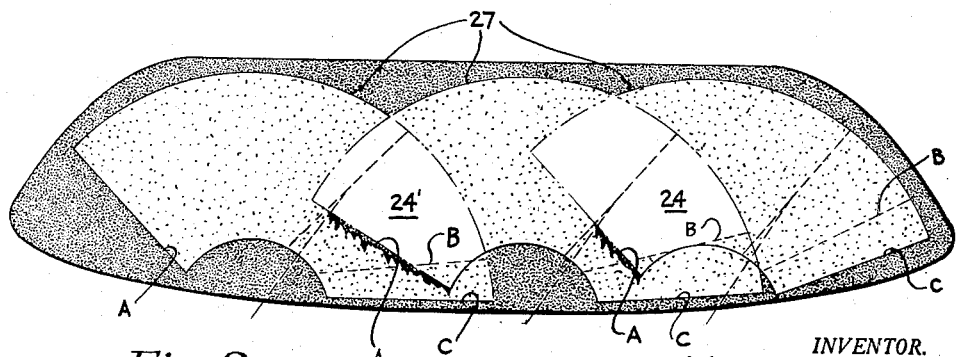
Fig. 3 is a plan layout depicting the doubly wiped and singly wiped patterns produced by the windshield cleaner.

The composite field is swept clean during each cycle of wiper operation, as will be seen from the developed flat plan view, Fig. 3, looking from the front of the car. At the ends of their counterclockwise strokes, the wipers deposit their collected moisture in the terminal positions A and at the ends of their clockwise strokes the deposits are made in the terminal positions B. The wipers, on their clockwise strokes, discharge collected moisture to the lower edge of the windshield. Any deposit left by a preceding counterclockwise stroke of the wiper 19' at the far margin of the primary field 24 will be swept downwardly by the succeeding clockwise stroke of the medial wiper 19. As the latter returns in a counterclockwise direction, it will pick up other moisture and deposit it at the left margin of the primary field 24' to be carried off by the next clockwise travel of wiper 19". Thus, the entire composite expanse is cleared thoroughly during each cycle.

Figure 4:
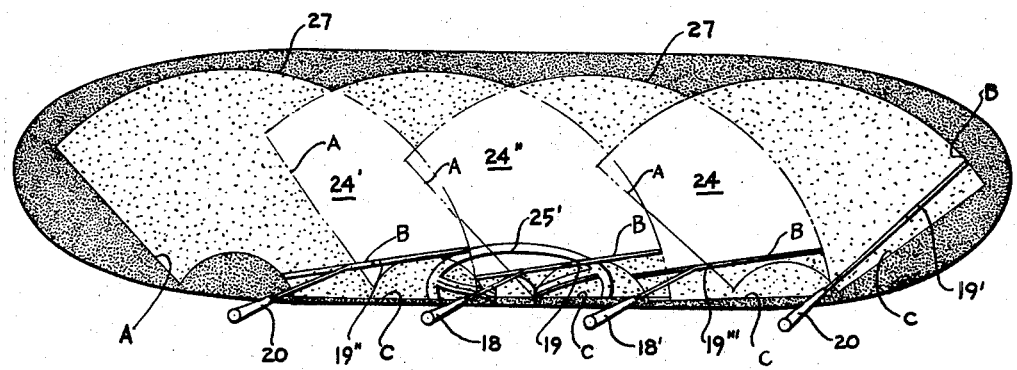
Fig. 4 is a plan layout similar to Fig. 3 but showing a cleaner embodying four wiper blades including a centrally positioned pair of wipers.

In the embodiment shown in Fig. 4 the medial wiping means of the windshield cleaning system comprises a pair of wipers, through the addition of a fourth wiper 19''' carried by its arm 18'. This results in materially increasing the spread transversely of the doubly wiped primary field area and brings the primary fields 24, 24', and 24" into such proximity as to overlap them thereby to compose one continuous doubly wiped area across the shield. Thus, the driver has the advantage of a wide vision area at both sides of the centrally located steering wheel 25', which area is doubly wiped by the oscillatory type of windshield cleaner which latter has long been accepted in the industry as a satisfactory and efficient windshield cleaner. With the present invention, the primary object has been attained in a practical and effective manner to extend a doubly cleaned area across the windshield and thus to afford a broad forward vision area during inclement weather which is further supplemented by a singly wiped area for a full width panorama of the road ahead.

From the foregoing it will be observed that the oscillating wipers are so positioned as to provide a transverse series of individual fields of vision. In the embodiment shown in Fig. 1 a transverse series of two individual fields of vision are provided by the oscillating wipers each doubly wiped, one for the driver and the other for his front seat passenger, while in the arrangement shown in Fig. 4 a transverse series of three individual fields of vision are effected and merged into a solid doubly wiped panel for the central driver. Each doubly wiped field is substantially rectangular in shape being defined by portions of the intersecting outer arcs of the two paths of cooperating wipers and the adjacent limit positions A and B of such wipers where they have made their deposit of moisture just squeegeed off such field in passing downwardly thereover. As the wipers move counterclockwise, in Figs. 1 and 4, the squeezed moisture will be deposited in the paths of the adjacent wipers to be carried away from the vision area on their following clockwise strokes so that the entire expanse will be cleaned on each wiping cycle, and the deposits at the lower edge of the windshield will be moved clear thereof when the wipers are finally parked in positions C against the windshield molding.

As each crest wiper is oscillated over its corner section of the shield, the torque load on the wiper motor will vary depending upon the direction of movement. When the wiper squeegees upwardly over the side area 4 greater motive force is required in comparison to that required to drive the wiper outwardly in a downward direction. Therefore, by operating the two crest wipers in phase, so that one wiper moves upwardly over the side area and inwardly over the frontal area as the companion wiper moves outwardly over the frontal area and downwardly over the crest and side areas, the torque load on the motor will be equalized to save on the mechanism.

The foregoing description has been given in detail without thought of limitation since the inventive principles involved are capable of assuming other physical embodiments without departing from the spirit of the invention and the scope of the appended claim.

What is claimed is:

A windshield cleaner for a vehicle having a windshield of the panoramic type with frontal and lateral areas joined by more sharply curved crest areas, said cleaner comprising spaced wiper shafts each journaled at the lower side of an associated windshield adjacent a respective crest area thereof for oscillating carried wiper means over the latter and downwardly on the joined frontal and respective lateral areas, medial wiper shaft means journaled at the lower side of the frontal area between said spaced wiper shafts and oscillating carried wiper means in a path of movement across the center of the frontal area that intersects the top margins of the paths of movement of the spaced wiper means above the forward lines of sight of vehicle occupants at opposite sides of the center, the path of movement of the medial wiper means overlapping the paths of the spaced wiper means on the frontal area and for a distance beneath the forward lines of sight to provide within the latter area doubly wiped forward vision fields on both sides of the center, and drive means to oscillate all said carried wiper means in substantially parallel relation, said drive means operating differentially on said spaced wiper shafts and said wiper shaft means to impart to said medial wiper shaft means a relatively greater and faster speed of movement, said wiper means acting to sweep away any deposit left by a previous wiping at the margins of such doubly wiped vision fields.

References Cited in the file of this patent

UNITED STATES PATENTS

| | | |
|---|---|---|
| 2,263,053 | Schuler | Nov. 18, 1941 |
| 2,691,186 | Oishei et al. | Oct. 12, 1954 |
| 2,825,919 | Horton | Mar. 11, 1958 |
| 2,827,653 | Dyer et al. | Mar. 25, 1958 |

FOREIGN PATENTS

| | | |
|---|---|---|
| 480,584 | Italy | May 7, 1953 |
| 625,939 | France | Aug. 23, 1927 |